United States Patent Office 3,764,478
Patented Oct. 9, 1973

3,764,478
STABILIZED ENZYMATIC TEST REAGENTS
Hans Ulrich Bergmeyer, Tutzing, Upper Bavaria, and Erich Bernt, Munich, Germany, assignors to Boehringer Mannheim GmbH, Mannheim-Waldhof, Germany
No Drawing. Filed June 9, 1970, Ser. No. 44,877
Claims priority, application Germany, June 13, 1969,
P 19 30 059.5
Int. Cl. G01n 31/14
U.S. Cl. 195—99                                    8 Claims

ABSTRACT OF THE DISCLOSURE

Enzymatic test reagents containing nicotinamide-adenine-dinucleotide and/or nicotinamide-adenine dinucleotide phosphate, in reduced or oxidized form, or purine or pyrimidine nucleotides, are stabilized by incorporating therein effective amounts of polyvinyl-pyrrolidone.

---

The present invention is concerned with stabilized enzymatic test reagents and with a process for the preparation thereof.

For enzymatic investigations, especially for diagnostic purposes, it is of great importance that the substances necessary for the enzymatic reaction, such as substrates, enzymes, co-enzymes, buffer substances and the like, are available ready for use and in the correct proportions. By means of combined preparations, which already contain all the substances necessary for the reaction, certain tests can be carried out simply and with certainty, even with only semi-skilled personnel.

However, hitherto extraordinary difficulties have been encountered in attempting to provide such combined preparations. Thus, it has been found that the necessary substances, which are relatively stable in pure form, frequently become unstable in the presence of other components of the test preparation and, therefore, in the course of storage, suffer from such a marked loss of activity and concentration that the combined preparations are of doubtful utility. This applies particularly to combined preparations which contain nicotinamide-adenine-dinucleotide (NAD/NADH) and/or nicotinamide-adenine-dinucleotide-phosphate (NADP/NADPH) in reduced or oxidized form, as well as purine or pyrimidine nucleotides.

For the stabilization of such combined enzymatic test reagents, it is known to use SH-group-containing substances, especially glutathione. However, the use of such substances has proved to be not entirely satisfactory since it has been ascertained that they can inhibit certain enzymes and the SH-group-containing reagents which have hitherto been found to be useful for this purpose, especially glutathione, are sensitive to oxidation and, in addition, are frequently too expensive. Furthermore, the stabilizing action itself was not always completely satisfactory.

We have now found that the above-mentioned difficulties can be overcome by the use of polyvinyl-pyrrolidone.

Thus, according to the present invention, there is provided a stabilized combined enzymatic test reagent which contains nicotinamide-adenine-dinucleotide and/or nicotinamide-adenine dinucleotide-phosphate in reduced or oxidized form, together with polyvinyl-pyrrolidone as stabilizer.

It is admittedly already known to use polyvinyl-pyrrolidone in order to prevent the sublimation of inorganic components in the lyophilization of labile substances. However, this known use of polyvinyl-pyrrolidone as a lyophilizing adjuvant differs fundamentally from the stabilizing action which has now been found in the case of combined enzymatic test reagents, use of which is made by the present invention, and was not to have been foreseen.

Apart from polyvinyl-pyrrolidone and NAD/NADH and/or NADP/NADPH, the test reagent combination according to the present invention expediently also contains all the other substances necessary for carrying out the test reaction in question, such as enzymes, co-enzymes, substrates, buffer substances, adjuvants and possibly also filler materials.

Examples of enzymes which can also be present include hexokinase, glucose-6-phosphate-dehydrogenase, lactate-dehydrogenase, malate- dehydrogenase, glycero-phosphate-dehydrogenase, triose-phosphate-isomerase, pyruvate-kinase, sorbitol-dehydrogenase, aldolase, glutamate-oxalacetate-transaminase, glyceraldehyde-3-phosphate-dehydrogenase and phosphoglycerate-kinase. However, numerous other enzymes can also be used.

Examples of co-enzymes which can also be used include adenosine triphosphate, phosphoadenylic acid sulphate, adenosyl-methionine, uridine diphosphate, cytidine diphosphate, coenzyme A, tetrahydrofolic acid, biotin, thiamine pyrophosphate, pyridoxal phosphate, nicotinamide-mononucleotide, flavine-mononucleotide, flavine-adenine-dinucleotide, cell haemin and $B_{12}$-coenzyme. Furthermore, to these also belong the above-mentioned hydrogen-transferring coenzymes NAD/NADH

NADP/NADPH one or both of which must be present.

Examples of substrates for the enzymatic reactions to be carried out include amino acids, such as alanine, keto acids, such as $\alpha$-keto-glutarate, sugars, such as glucose, sugar phosphates, such as fructose-1,6-diphosphate, phosphoric acid esters, such as phosphorenol pyruvate and creatine phosphate, and SH-group-containing compounds, such as glutathione, and the like.

Examples of buffer substances which can be used include the alkali metal salts of phosphoric acid and mixtures thereof, salts of acetic acid, boric acid and phthalic acid with strong alkalis and organic compounds, such as trishydroxymethylaminomethane and the like, such as are normally used for biochemical reactions.

The term "filler materials" as used herein includes these non-ionic organic compounds which facilitate lyophilization. Examples of such substances include gelatine, albumins and similar substances.

Finally, the adjuvants, which may be used are other substances which are necessary or desirable for the intended biochemical reaction, for example, salts containing certain ions, activation agents, such as reduced glutathione for hexokinase, and the like.

The necessary composition is, in general, well known. The necessary amount of the polyvinyl-pyrrolidone stabilizer to be used according to the present invention, without disturbing or influencing the desired test reaction, can readily be ascertained by preliminary test.

The preparation of the test reagent combinations according to the present invention can be carried out in the following manner:

(1) All the substances necessary for carrying out the intended reaction (auxiliary enzymes, coenzymes, substrates, buffer substances, adjuvants and possibly also filler materials) are, together with polyvinyl-pyrrolidone in the amounts optimum for the intended reaction, mixed with water to give a solution, the volume and pH value of which is adjusted in the desired manner;

(2) This solution is placed in suitable amounts for the test onto appropriate containers;

(3) The content of these containers is lyophilized and the containers are then immediately sealed.

The test reagent combinations according to the present invention are porous powders which are readily soluble in water but which can be stored satisfactorily for years in closed containers. They represent a considerable advance in the field of reagent compositions for enzymatic investigations. The user has now only to dissolve the content of the appropriate container in a definite amount of water, to add the substance to be investigated, for example serum, and to carry out the measurement according to the instructions provided, for example measurement of extinction in the photometer.

The stabilizer used according to the present invention is completely stable to oxidation, provides a very good stabilizing effect, is cheap and exerts no influence on the activity of the enzymes used.

The following examples are given for the purpose of illustrating the present invention:

EXAMPLE 1

Preparation for the determination of glutamate-pyruvate-trasaminase (GPT)

|  | Grams |
|---|---|
| Disodium monohydrogen phosphate monohydrate | 2.43 |
| Monosodium dihydrogen phosphate dihydrate | 0.21 |
| DL-alanine | 2.05 |
| α-Keto-glutarate | 0.35 |
| Polyvinyl-pyrrolidone | 1 |
| Serum albumin | 0.30 |
| Reduced nicotinamide-adenine-dinucleotide | 0.05 |
| Lactate dehydrogenase | 0.0015 |

The above components were dissolved in 90 ml. of twice distilled water and the pH of the solution obtained then adjusted to 7.6 with a dilute aqueous solution of sodium hydroxide. The solution was then made up to 100 ml. with double distilled water, subsequently frozen and then lyophilized.

EXAMPLE 2

Preparation for the determination of glucose

|  | Grams |
|---|---|
| Triethanolamine hydrochloride | 6.200 |
| Sodium carbonate | 0.700 |
| Nicotinamide-adenine-dinucleotide-phosphate | 0.050 |
| Adenosine-5'-triphosphate | 0.050 |
| Polyvinyl-pyrrolidone | 1.0 |
| Hexokinase | 0.005 |
| Glucose-6-phosphate-dehydrogenase | 0.005 |
| Serum albumin | 0.300 |

The components were worked up in the manner described in Example 1.

EXAMPLE 3

Preparation for the determination of aldolase

|  | Grams |
|---|---|
| Disodium monohydrogen phosphate monohydrate | 2.43 |
| Monosodium dihydrogen phosphate dihydrate | 0.21 |
| Fructose-1,6-diphosphate | 0.14 |
| Iodoacetate | 0.005 |
| Polyvinyl-pyrrolidone | 1.0 |
| Serum albumin | 0.30 |
| Reduced nicotinamide-adenine-dinucleotide | 0.05 |
| Glycerophosphate-dehydrogenase | 0.0015 |
| Triose-phosphate-isomerase | 0.0015 |

The components were worked up in the manner described in Example 1.

EXAMPLE 4

Preparation for the determination of pyruvate kinase

|  | Grams |
|---|---|
| Triethanolamine hydrochloride | 2.100 |
| Potassium chloride | 0.700 |
| Magnesium sulphate | 0.300 |
| Ethylene-diamine-tetraacetate | 0.040 |
| Sodium carbonate | 0.250 |
| Reduced nicotinamide-adenine-dinucleotide | 0.050 |
| Adenosine-5-diphosphate | 0.190 |
| Lactate-dehydrogenase | 0.001 |
| Serum albumin | 0.300 |
| Polyvinyl-pyrrolidone | 1.000 |
| Phosphoenol-pyruvate | 0.100 |

The components were worked up in the manner described in Example 1.

EXAMPLE 5

Preparation for the determination of creatine-kinase

|  | Grams |
|---|---|
| Triethanolamine hydrochloride | 2.100 |
| Sodium carbonate | 0.250 |
| Adenosine-5'-diphosphate | 0.100 |
| Adenosine-5'-monophosphate | 1.000 |
| Magnesium acetate | 0.250 |
| Nicotinamide-adenine-dinucleotide-phosphate | 0.100 |
| Glucose | 0.100 |
| Creatine phosphate | 15.000 |
| Reduced glutathione | 0.800 |
| Hexokinase | 0.005 |
| Glucose-6-phosphate-dehydrogenase | 0.005 |
| Serum albumin | 0.300 |
| Polyvinyl-pyrrolidone | 1.00 |

The components were worked up in the manner described in Example 1 except that the pH value was maintained at 7.0.

EXAMPLE 6

Preparation for the determination of glutathione-reductase

|  | Grams |
|---|---|
| Disodium monohydrogen phosphate dihydrate | 2.43 |
| Monosodium dihydrogen phosphate dihydrate | 0.21 |
| Polyvinyl-pyrrolidone | 1.00 |
| Serum albumin | 0.300 |
| Reduced nicotinamide-adenine-dinucleotide-phosphate | 0.050 |
| Oxidized glutathione | 0.250 |

The components were worked up in the manner described in Example 1 except that the pH value was maintained at 7.0.

EXAMPLE 7

Preparation for the determination of ethanol

|  | Grams |
|---|---|
| Sodium pyrophosphate decahydrate | 3.300 |
| Semicarbazide hydrochloride | 0.700 |
| Glycine | 0.200 |
| Alcohol dehydrogenase | 0.050 |
| Nicotinamide-adenine-dinucleotide | 0.100 |
| Serum albumin | 0.300 |
| Polyvinyl-pyrrolidone | 1.000 |

The components were worked up in the manner described in Example 1 except that the pH value was maintained at 8.6.

EXAMPLE 8

Preparation for the determination of glutamate-oxalacetate-transaminase (GOT)

| | Grams |
|---|---|
| Disodium monohydrogen phosphate dihydrate | 2.43 |
| Monosodium dihydrogen phosphate dihydrate | 0.21 |
| L-aspartate | 1.50 |
| α-Keto-glutarate | 0.35 |
| Polyvinyl-pyrrolidone | 1.00 |
| Serum albumin | 0.30 |
| Reduced nitcotinamide-adenine-dinucleotide | 0.05 |
| Lactate-dehydrogenase | 0.0015 |
| Malate-dehydrogenase | 0.0015 |

The components were worked up in the manner described in Example 1.

The amount of polyvinyl-pyrrolidone effective for stabilization depends, to some extent, on the particular enzymatic test composition in which it is used. Generally, amounts of from 1 to 30 weight percent, based on total test reagent mixture, will be found satisfactory. Amounts of from 5 to 25 weight percent, based on total test reagent mixtures, will be preferred.

We claim:

1. A stabilized combined enzymatic test reagent which consists of at least one nucleotide coenzyme selected from the group consisting of nicotinamide-adenine-dinucleotide, nicotinamide-adenine-dinucleotide phosphate, in reduced or oxidized form, and, as a stabilizer, stabilizingly effective amounts of polyvinyl-pyrrolidone.

2. A test reagent as claimed in claim 1, which additionally contains at least one buffer substance, substrate, coenzyme, activation agent or filler material.

3. A test reagent is claimed in claim 1, in which the polyvinyl-pyrrolidone is present in amounts of from 5 to 25 weight percent, based on total test reagent.

4. A test reagent as claimed in claim 1 wherein the coenzyme is nicotinamide-adenine-dinucleotide in reduced or oxidized form.

5. A test reagent as claimed in claim 1 wherein the coenzyme is nicotinamide-adenine-dinucleotide-phosphate in reduced or oxidized form.

6. Process for the preparation of a stabilized combined enzymatic test reagent as claimed in claim 1, wherein all the components necessary for the carrying out of the intended test are dissolved in water and the pH of the aqueous solution is, if necessary, adjusted to a desired value, whereafter the aqueous solution is lyophilized.

7. Process as claimed in claim 6, wherein the aqueous solution is placed in a container in an amount sufficient for carrying out the intended test and is then lyophilized.

8. Process as claimed in claim 6 wherein the polyvinyl-pyrrolidone is present in amounts of from 5 to 25 weight percent based on total test reagent.

References Cited

UNITED STATES PATENTS

| 3,413,198 | 11/1968 | Deutsch | 195—103.5 R |
| 3,228,838 | 1/1966 | Rinfret et al. | 195—96 |
| 3,594,471 | 7/1971 | Hertzberger et al. | 424—92 X |
| 3,066,081 | 11/1962 | Rorem et al. | 195—103.5 C |

OTHER REFERENCES

Chemical Abstracts, 63:8724 (1965).

ALVIN E. TANENHOLTZ, Primary Examiner

M. D. HENSLEY, Assistant Examiner

U.S. Cl. X.R.

195—103.5